United States Patent [19]

Kato et al.

[11] Patent Number: 4,759,330

[45] Date of Patent: Jul. 26, 1988

[54] FUEL INJECTION CONTROL APPARATUS FOR USE IN AN ENGINE

[75] Inventors: Masaaki Kato; Hiroaki Nishimaki, both of Kariya; Toshihiko Omori, Nagoya; Hitoshi Sekijima, Kariya, all of Japan

[73] Assignee: Nippondenso Co., Ltd., Kariya, Japan

[21] Appl. No.: 845,254

[22] Filed: Mar. 28, 1986

[30] Foreign Application Priority Data

Mar. 30, 1985 [JP] Japan .................. 60-67064

[51] Int. Cl.⁴ ........................... F02M 39/00
[52] U.S. Cl. .................... 123/446; 123/447
[58] Field of Search ............... 123/445, 446, 447, 458, 123/501, 500; 239/88-95

[56] References Cited

U.S. PATENT DOCUMENTS

| | | | |
|---|---|---|---|
| 4,402,456 | 9/1983 | Schneider | 123/446 |
| 4,418,867 | 12/1983 | Sisson | 123/446 |
| 4,425,894 | 1/1984 | Kato | 123/446 |
| 4,537,352 | 8/1985 | Kato | 123/446 |
| 4,538,576 | 9/1985 | Schneider | 123/446 |

Primary Examiner—Carl Stuart Miller
Attorney, Agent, or Firm—Cushman, Darby & Cushman

[57] ABSTRACT

The fuel in a compression pump chamber, defined by a compression plunger, is expelled by the compression plunger driven synchronously with the rotation of an engine. An injection plunger is driven by the expelled fuel, thus injecting fuel into an injection pump chamber defined by the injection plunger. A timing passage, closed by the compression plunger, is formed in the compression pump chamber, and a metering passage is formed in the injection pump chamber. The timing and metering passages communicate with a timing valve and a quantity control valve respectively arranged in an electromagnetic valve. The timing and quantity control valves are driven by an energization current such that they operate in cooperation with each other, i.e., when the timing valve is open, the quantity control valve is closed. When the timing valve is closed and the compression plunger returns, the injection plunger also returns and fuel is supplied to the injection pump chamber through the quantity control valve, which is open. The quantity of fuel filled in the injection pump chamber is controlled by the time interval during which the quantity control valve is open. The time interval during which the fuel is supplied to the pump chamber through the quantity control valve is calculated so as to correspond with engine conditions.

13 Claims, 10 Drawing Sheets

F I G. 11
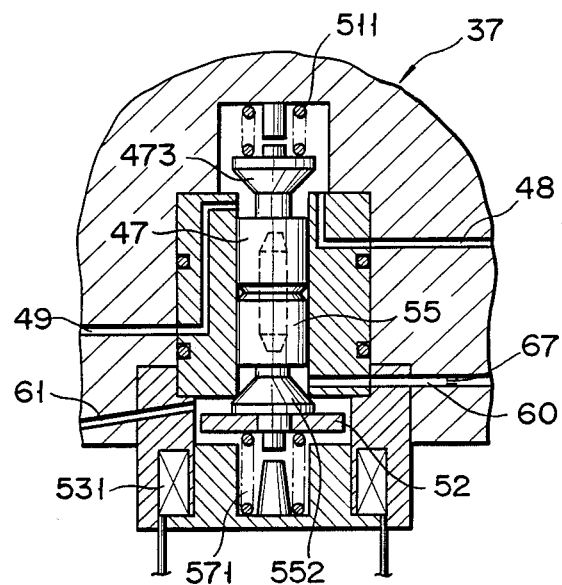
F I G. 12
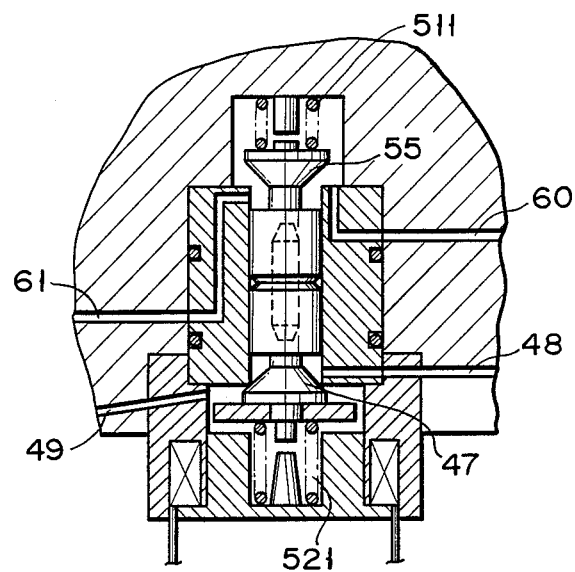

FUEL INJECTION CONTROL APPARATUS FOR USE IN AN ENGINE

BACKGROUND OF THE INVENTION

This invention relates to a fuel injection control apparatus, which is used in diesel engines, for example, and which controls the amount of fuel injected in response to operating conditions of the engine.

A unit injector, which injects a controlled amount of fuel, is disclosed in U.S. Pat. No. 4,418,867. Fuel is supplied when an electromagnetic valve is energized, and the energizing current is supplied to the valve for a time period corresponding to the amount of fuel that is to be injected. When this controlled quantity of fuel is to be injected, the electromagnetic valve is operated again to close the compression pump chamber and the compression plunger of the pump operates to inject this controlled quantity of fuel.

With this kind of unit injector, however, the fuel overflow is returned to the fuel feed path, which results in pressure fluctuations in the feed path, and this in turn results in unstable operation of the fuel injectors provided for the other cylinders. Also, the back flow caused by the overflow port results in uneven fuel injection in the particular cylinder itself.

This electromagnetic valve is a three-way valve and the needle portion is subject to very high pressure, which causes problems with providing the device with sufficient mechanical strength. The overflow fuel is conducted to the nozzle spring chamber and a throttle is arranged in the feed path from the nozzle spring chamber to prevent an abrupt drop in overflow pressure so that an unnecessarily strong force acts on the nozzle needle, possibly damaging it.

SUMMARY OF THE INVENTION

It is an object of the present invention to provide a fuel injection control apparatus for an engine, in which fuel injection control and injection quantity control can be performed by a single electromagnet valve.

It is another object of the invention to provide a fuel injection control apparatus, in which the electromagnetic valve can perform fuel injection timing control and injection quantity control separately so as to achieve a stable fuel injection operation.

It is still another object of the invention to perform injection timing control and injection quantity control without the application of a high fuel pressure to the electromagnetic valve; thus achieving highly reliable fuel injection control.

In the fuel injection control apparatus according to the present invention, an injection plunger is driven by fuel pressure in a compression pump chamber defined by a compression plunger. A injection pump chamber defined by the injection plunger is filled with an adjusted quantity of to be injected fuel. The apparatus comprises an electromagnetic valve having a timing valve and a fuel quantity control valve which are driven in a cooperative fashion; i.e., when one is open the other is closed. When the timing valve is closed, fuel cannot be expelled from the compression pump chamber, pressure in the compression pump chamber increases upon movement of the compression plunger, and the injection plunger is thus driven to inject the fuel. In other words, the injection timing is controlled by the timing valve. The fuel quantity control valve is opened upon return of the compression plunger so that fuel is supplied to the injection pump chamber. Thus, the fuel supply interval corresponding to the open state of the fuel quantity control valve determines the quantity of fuel filled in the injection pump chamber. Compressed fuel is supplied to the fuel quantity control valve through a check valve mechanism, thus allowing fuel to be delivered only when the pressure in the injection pump chamber is low.

More specifically, injection timing control and fuel quantity control can be independently performed by the single electromagnetic valve. In the injection timing control mode, the fuel quantity control passage is closed by the pressure in the injection pump chamber so the injection plunger can be stably operated, thereby achieving a stable, quantity-controlled fuel injection operation.

BRIEF DESCRIPTION OF THE DRAWINGS

FIG. 11 is a sectional view of an electromagnetic valve portion for explaining a third embodiment of the present invention; and FIG. 12 is a sectional view of an electromagnetic valve portion for explaining a fourth embodiment of the present invention.

DETAILED DESCRIPTION OF THE PREFERRED EMBODIMENTS

Figure 1:
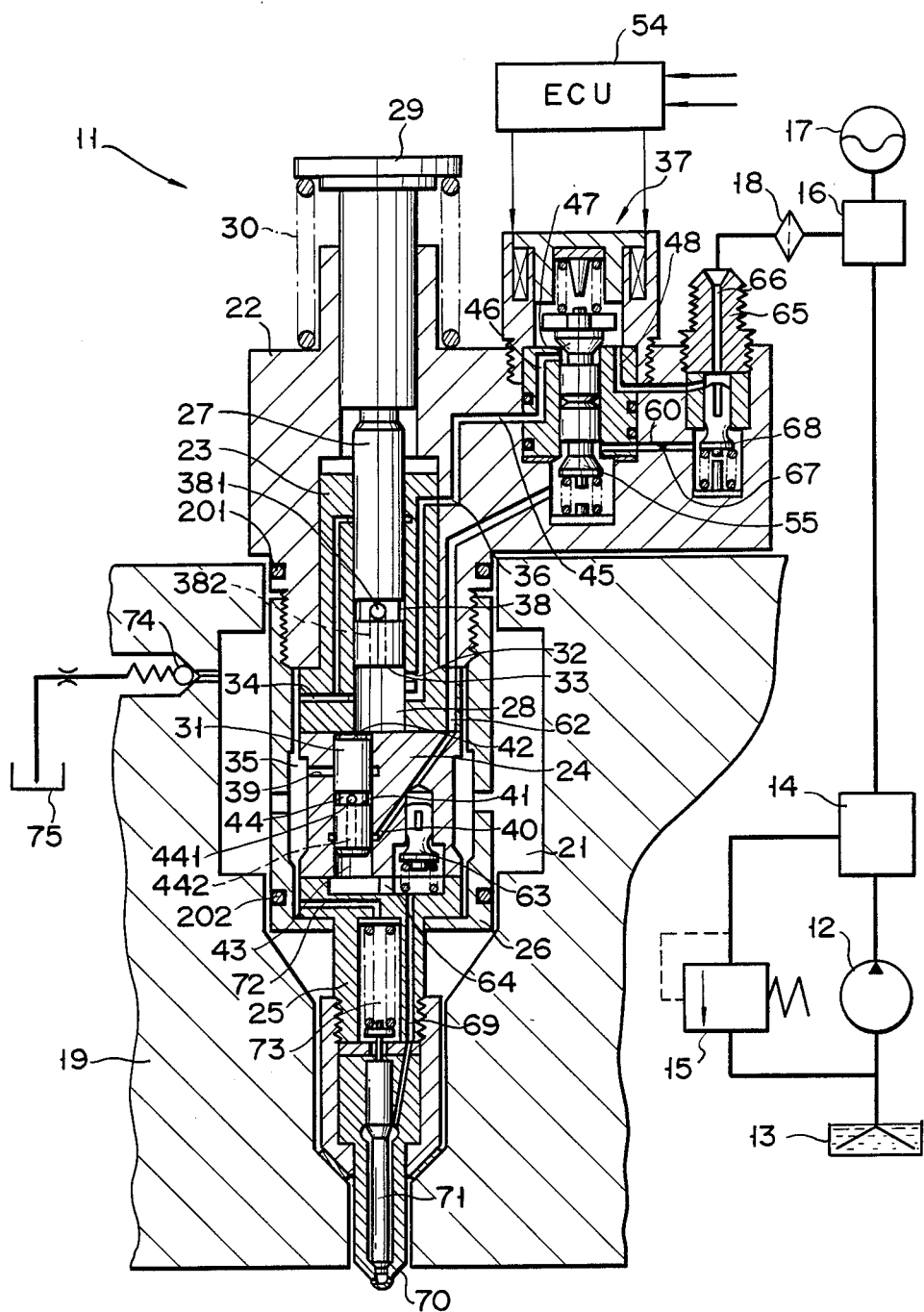
FIG. 1 is a sectional view for explaining a fuel injection control apparatus according to a first embodiment of the present invention.

FIG. 1 mainly shows one of a plurality of unit injectors, respectively arranged in a plurality of cylinders of an engine.

Fuel compressed by a feed pump 12 is distributed to injector 11. The feed pump 12 draws fuel from fuel tank 13 by suction, and supplies it to main gallery 14. A pressure in pump 12 is set at a predetermined value by pressure control valve 15. The fuel at a predetermined pressure is supplied to subgallery 16, so that variation in pressure thereof is absorbed by accumulator 17. The fuel at a stabilized pressure is supplied to unit injectors 11 arranged in respective cylinders of an engine, through filters 18.

Each unit injector 11 is mounted on engine head 19, and fuel gallery 21 is defined by O-rings 201 and 202 between head 19 and injector 11.

In unit injector 11, compression cylinder 23, injection cylinder 24, and nozzle holder 25 are serially arranged in injector body 22, and are coupled by holder nut 26.

Compression plunger 27 is movable in compression cylinder 23, and compression pump chamber 28 is defined by plunger 27 in a portion of cylinder 23 at the side of injection cylinder 24. Compression pump chamber 28 communicates with injection cylinder 24.

Compression plunger 27 is mounted integrally with cam follower 29, which receives the biasing force from spring 30. Plunger 27 always receives a force to expand compression pump chamber 28.

Cam follower 29 applies a force against spring 30 to a cam (not shown) rotated synchronously with the engine, with or without being connected thereto through a rocker arm, a push rod or the like, and is moved downward in FIG. 1 to be synchronous with rotation of the engine and to correspond with a fuel injection timing.

Injection cylinder 24 has a smaller diameter than that of compression cylinder 23. Injection plunger 31 is movable in cylinder 24, and is moved by pressure in compression pump chamber 28.

Timing port 32 is formed in cylinder 23 to be open to compression pump chamber 28. When compression plunger 27 moves downward, timing port 32 is closed by timing reed 33. Delta port 34 is formed in cylinder 23 adjacent to timing port 32, and is closed after port 32, when plunger 27 moves downward. Port 34 is formed to be narrower than port 32, and communicates with port 32 and then with fuel gallery 35, defined between cylinder 24 and holder nut 26. Port 32 communicates with electromagnetic valve through timing passage 36.

Annular groove 38 is formed in compression plunger 27, and temporarily opens port 32 when plunger 27 moves downward. Lateral hole 381 and longitudinal hole 382 are formed in plunger 27 to communicate with groove 38 and compression pump chamber 28. When groove 38 opens port 32, pump chamber 28 can communicate with fuel gallery 35.

Drain port 39 and spill port 40 are open to injection cylinder 24. Spill reed 41 and drain reed 42 are formed in injection plunger 31 to open/close port 39 or 40. Injection pump chamber 43 is formed in injection cylinder 24 and is defined by plunger 31. Annular groove 44 is formed in a portion of injection plunger 31 corresponding to spill reed 41, and communicates with pump chamber 43 through lateral hole 441 and longitudinal hole 442.

Figure 2:
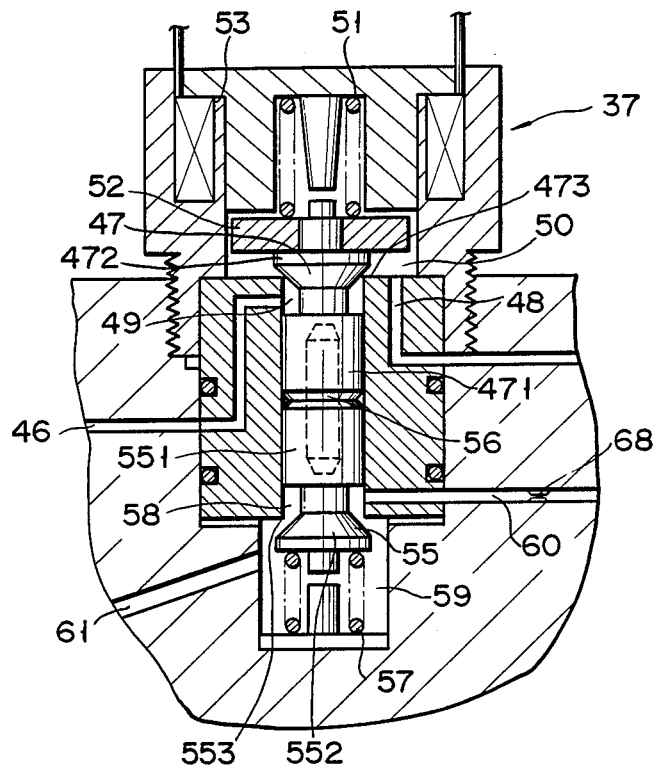
FIG. 2 is a partially enlarged sectional view of an electromagnetic valve used in the apparatus in FIG. 1.

FIG. 2 shows electromagnetic valve 37 in more detail. Valve 37 comprises feed communication port 46, which communicates timing passage 36 to a portion of timing valve 47. Port 46 communicates with feed communication port 48 through timing valve 47.

Timing valve 47 comprises columnar main body 471 and valve disk 472 coaxial with body 471. Valve disk 472 is formed into an umbrella-like shape having a tapered surface which is selectively in contact with valve seat 473 upon axial movement of body 471. In this case, annular chamber 49 is formed between body 471 and valve disk 472, and communicates with feed chamber 50 through valve seat 473. Feed communication port 48 is open to feed chamber 50. A passage between ports 46 and 48 is formed when valve disk 472 moves upward to its upper position in FIG. 2 to be separate from valve seat 473. However, the passage is closed when valve disk 472 is positioned at its lower position by the biasing force of spring 51.

Core 52 is formed integrally with timing valve 47 and is drawn by suction against the biasing force of spring 51 when an energization current is supplied to electromagnetic solenoid 53, so as to cause valve 47 to open the fuel passage. Solenoid 53 is controlled by engine control unit 54. Unit 54 include with microcomputer calculates a fuel injection timing, a fuel injection quantity, and the like based on detection signals of engine conditions (e.g., an amount of intake air and the like), and determines the energization current supplied to solenoid 53 based on the calculation result.

Injection quantity control valve 55 is arranged coaxially with timing valve 47. Control valve 55 comprises columnar main body 551, and valve disk 552 having a tapered surface facing that of disk 472. Body 551 is arranged coaxially with body 471 of valve 47, to be in contact therewith. Body 551 is in contact with body 472 at separation surface 56, and is biased by spring 57 in the direction of valve 47. When the energization current is supplied to solenoid 53, valve 55 can be driven with valve 47. In this case, the biasing force of spring 57 is set to be weaker than that of spring 51.

In valve 55, annular chamber 58 is formed between body 551 and disk 552, and is adjacent to metering chamber 59 through valve seat 553. Chambers 58 and 59 communicate with metering communication ports 60 and 61, and a passage between ports 60 and 61 is open/closed by valve 55. In this case, control valve 55 is operated in a way opposite to timing valve 47.

Metering communication port 61 communicates with injection-quantity control check valve 63 and spill port 40 through metering passage 62 of the injector portion shown in FIG. 1, and is further introduced to metering port 64 through check valve 63, so that fuel is supplied from port 64 to injection pump chamber 43.

Electromagnetic valve 37 is connected to connector 65, and feed communication passage 48 of valve 37 communicates with a fuel circuit of feed pump 12 through passage 66 of connector 65. Port 60 communicates with passage 66 through check valve 68. When a back pressure in port 60 is low, fuel from feed pump 12 is supplied to pump 12 through orifice 67.

Pump chamber 43 communicates with fuel injection passage 69 formed in nozzle holder 25 through metering port 64. A fuel pressure in passage 69 acts on injection nozzle 70, so that needle valve 71 mounted on nozzle 70 is opened as a fuel pressure in passage 69 increases. When the fuel pressure in injection pump chamber 43 increases, it acts as a valve-opening pressure on valve 71, and fuel filled in pump chamber 43 is then injected from nozzle 70.

Drain port 39 of cylinder 24 communicates with fuel gallery 35, which communicates with nozzle spring chamber 73 through leakage passage 72 and then with fuel gallery 21 formed in head 19. Fuel from gallery 21 is introduced into fuel tank 75 through check valve 74.

In unit injector 11 with the above arrangement, compression plunger 27 is driven against the biasing force of spring 30 in synchronism with rotation of the engine. During this operation, assume that plunger 27 is positioned at its upper dead point A (FIG. 3) and then moves downward. At this time, an angle pulse signal from a pulse signal generator operated synchronously with rotation of the engine is detected as a reference signal. Optimal fuel injection angle $\alpha_T$ is calculated based on detection signals (e.g., of engine speed, load state [fuel injection quantity], and the like), and the optimal injection timing (indicated by B in FIG. 3) is then determined with reference to a two-dimensional map shown in FIG. 4. More specifically, during setting of the injection timing, the angle pulse signals are counted and remaining angle $\theta_T$ is converted into time ($\{\theta_T/6\} \times$ engine speed) and then added to the count.

The energization current is supplied to solenoid 53 of electromagnetic valve 37 upon instruction of unit 54 before injection angle $a_T$. In this state, timing valve 47 is open, and fuel is supplied to compression pump chamber 28. When a pressure in pump chamber 28 becomes higher than a given value, the fuel in pump chamber 28 is expelled.

Since injection quantity control valve 55 is closed in this state, a given quantity of fuel fills injection pump chamber 43.

At injection timing B, the energization current supplied to solenoid 53 of valve 37 is cut off, so that timing valve 47 is closed and control valve 55 is open. More specifically, a fuel expulsion passage from compression pump chamber 28 is disconnected, and the pressure in pump chamber 28 increases upon downward movement of pump chamber 28. In this case, a high pressure in pump chamber 28 acts on timing valve 47. However, since upper and lower pressure-receiving areas of annular chamber 49 are equal, the fuel pressure from pump chamber 28 does not act on timing valve 47 while valve 47 is closed, and valve 47 is kept closed by spring 51.

In this state, fuel of an adjusted quantity is filled in injection pump chamber 43 by a given means (to be described later), and plunger 31 is located at a position corresponding to the fuel quantity.

The fuel in compression pump chamber 28 is expelled from the time plunger 27 begins to move downward until injection timing B is reached. Timing valve 47 is closed at timing B slightly before timing reed 33 closes timing port 32 upon downward movement of compression plunger 27, to interrupt fuel from being expelled from pump chamber 28. After timing B, the fuel pressure in pump chamber 28 increases upon downward movement of plunger 27, and is applied to plunger 31.

In this case, since delta port 34 of pump chamber 28 is still open, the fuel in pump chamber 28 continues to be expelled. However, since a cross-sectional area of port 34 is small, the quantity of fuel expelled is also small. Therefore, although the fuel pressure in pump chamber 28 increases upon downward movement of plunger 27, the rate of pressure increase is set at a small value. Injection plunger 31 is then moderately operated under increase in pressure in compression pump chamber 28.

The fuel in injection pump chamber 43 is supplied to nozzle 70 through fuel injection passage 69, and needle valve 71 is opened by fuel pressure in pump chamber 43, thus injecting the fuel supplied to nozzle 70. Note that when injection plunger 31 is slightly operated, a fuel injection rate is also small.

When plunger 27 is moved further downward to close delta port 34, the fuel pressure in compression pump chamber 28 abruptly increases to correspond with the movement of compression plunger 27. Plunger 31 is accelerated at a speed corresponding to a pressure-receiving area ratio between plungers 27 and 31, and the fuel injection rate also increases, as shown in FIG. 3.

Note that timing port 32 is open to a position corresponding to the largest delay angle, so that it is closed by timing reed 33 before the fuel pressure in port 32 reaches a maximum value. For this reason, fuel at high pressure is no longer supplied to timing valve 47, and the mechanical integrity of valve 37 can be assured.

Figure 3:
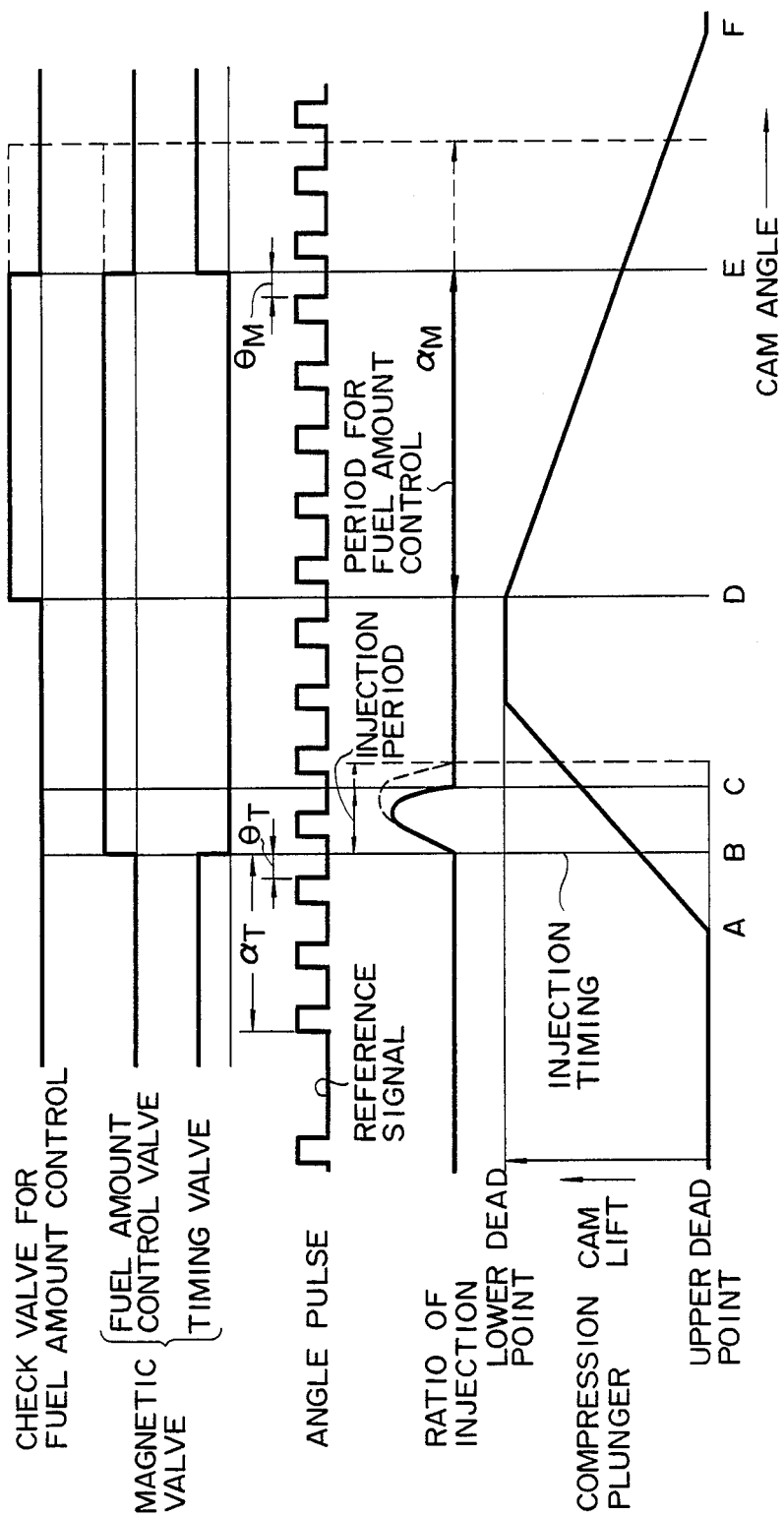
FIG. 3 is a timing chart for explaining a fuel injection control state using the electromagnetic valve.

When plunger 31 is operated and spill reed 41 thereof opens spill port 40 as described above, fuel in injection pump chamber 43 is returned to metering chamber 59 through passage 62, and is spilled from port 60 to check valve 68 at a timing corresponding to point C in FIG. 3. Therefore, in this state, the fuel pressure in pump chamber 43 is decreased and the fuel injection operation is completed.

More specifically, a quantity of fuel corresponding to an upper position of plunger 31 is injected. In other words, a fuel injection quantity is determined to correspond with a stroke of plunger 31 from its upper position to a position for opening spill port 40.

After the fuel injection operation is completed, compression plunger 27 moves further downward, as does injection plunger 31. However, since drain reed 42 opens drain port 39, fuel in pump chamber 28 is expelled into fuel gallery 35 through drain port 39, and movement of plunger 31 is temporarily interrupted.

Plunger 27 moves further downward to open timing port 32 with annular chamber 38 so that the fuel in pump chamber 28 is expelled through timing port 32 and then delta port 34, and thus plunger 27 reaches its lower dead point.

Fuel spilled from injection pump chamber 43 is returned thereto through passage 62 and check valve 63, and is used in each injection operation, thus improving fuel quantity control efficiency.

When compression plunger 27 reaches the lower dead point and moves upward again, timing port 32 is closed at point D in FIG. 3. Therefore, the pressure in pump chamber 28 is decreased, and a drawing force is then applied to injection plunger 31. As a result, a closing force of check valve 63 is decreased, and pressure in passage 62 and chamber 59 is also decreased, thus opening check valve 68 through a feed pressure from feed pump 12. Therefore, fuel compressed by feed pump 12 reaches check valve 63 through passage 62 to open it, thus feeding compressed fuel to pump chamber 43 through metering port 64.

A controlled fuel quantity is calculated by engine control unit 54 based on engine speed N and accelerator position $a$, and fuel quantity control period $a_M$ corresponding to the calculated fuel quantity is then calculated. Fuel quantity control period $a_M$ is set as in setting of fuel injection timing, such that an angle pulse signal as a reference signal is counted and remaining angle $a_M$ is converted into time and added to the count, thus setting point E in FIG. 3. At point E, the energization current is supplied to solenoid 53 of electromagnetic valve 37.

When the current is supplied to valve 37, valves 47 and 55 are switched to close control valve 55, thereby interrupting fuel supply to injection pump chamber 43. More specifically, a quantity of fuel filled in pump chamber 43 is determined by period $a_M$. Therefore, a fuel amount corresponding to the calculated fuel quantity is filled in injection pump chamber 43.

When control valve 55 is closed, timing valve 47 is open, and fuel is supplied to compression pump chamber 28 through timing port 32, so that injection plunger 31 can no longer be moved upward, thus completing a quantity control operation. (point E in FIG. 3).

Plunger 27 moves further upward, and reaches its upper dead point (point F in FIG. 3), and then repeats the above operation.

If there is a cylinder to be reduced or kept OFF, the energization current is supplied to solenoid 53, during the quantity control operation corresponding to the reduced cylinder to keep control valve 55 closed, so that fuel is not fed to injection pump chamber 43 of unit injector 11 of the reduced cylinder. In other words, the fuel quantity control operation is not performed in the reduced cylinder. A fuel quantity fed to injection pump chamber 43 corresponds to a stroke of injection plunger 31 within a time interval (angle) from the lower dead point of compression plunger 27 until the energization current is supplied to electromagnetic valve 37, i.e., control valve 55 is closed. The fuel quantity corresponds optimally with the engine conditions.

Figure 4:
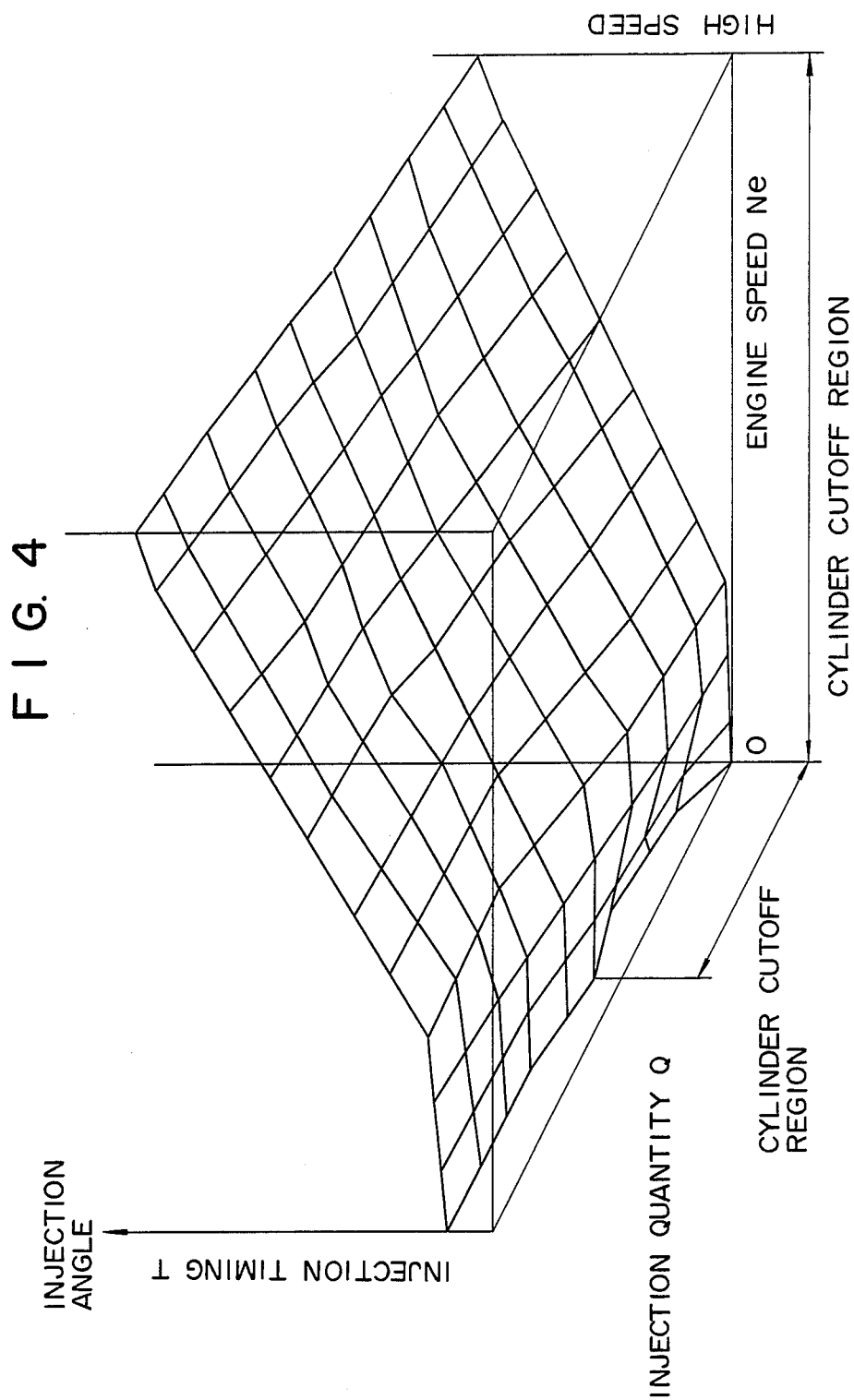
FIG. 4 is a two-dimensional map for setting a fuel injection condition in the apparatus in FIG. 1.
Figure 5:
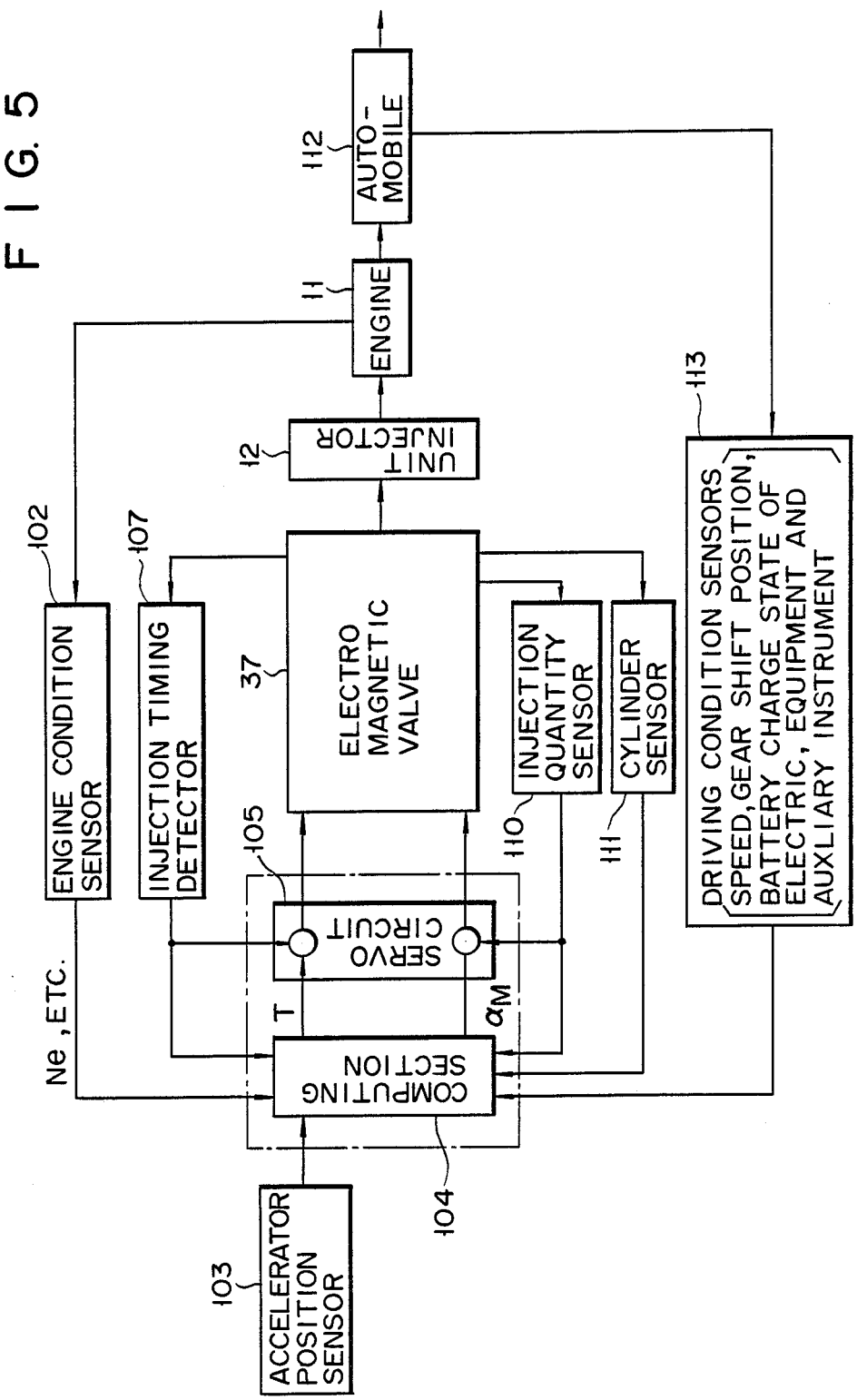
FIG. 5 is a block diagram for explaining a computing sequence for fuel injection control.

Control of electromagnetic solenoid 53 of electromagnetic valve 37 for setting quantity control and injection timing, and cylinder-reduction control in the fuel injection control apparatus of the present invention will now be described. In the control of valve 37 for setting the injection timing, the timing is interpolated in accordance with the two-dimensional map in which the injection timing is preset to correspond with the relationship between engine speed Ne and injection quantity Q, as shown in FIG. 4. More specifically, as shown in FIG. 5, detection signals of engine conditions (e.g., engine speed Ne of engine 101, engine temperature, intake pressure, and the like) are detected by engine condition sensor 102.

The detection signal from sensor 102 is supplied to computing section 104 together with a detection signal from an accelerator position sensor 103. Computing section 104 calculates injection timing angle $\alpha_T$, and injection period T is then interpolated from the map in FIG. 4. The energization current to electromagnetic valve 37 is controlled through servo circuit 105 so that valve 37 is open for a period of time corresponding to period T. Closing period T of timing valve 47 in valve 37 is detected by detector 107, and a detection signal therefrom is fed back to servo circuit 105.

Quantity control angle $\alpha_M$ controls valve 37 through servo circuit 105 as above. A fuel quantity is controlled such that the energization current supplied to solenoid 53 of valve 37 is cut off. The injection quantity corresponding to the operation of valve 37 is detected by injection quantity sensor 110, whose detection signal is fed back to computing section 104. At the same time, the number of cylinders is detected by cylinder sensor 111 and is supplied as a driving condition detection signal to computing section 104. In addition, driving condition information (e.g., vehicle speed, gear shift position, battery charge state, electric equipment, axially instruments, and the like) is detected by driving condition sensor 113, and is supplied to computing section 104.

Figure 6:
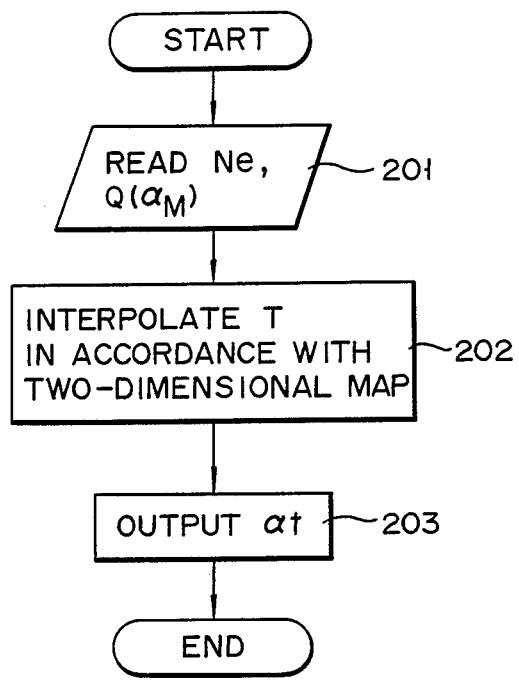
FIGS. 6 to 8 are flow charts for explaining an operation flow of the apparatus in FIG. 1.

FIG. 6 is a flow chart for calculating the injection timing controlled by electromagnetic valve 37. In step 201, engine speed Ne and injection quantity Q ($\alpha_M$) are fetched, and T is interpolated in accordance with the two-dimensional map in step 202. In step 203, target injection angle $\alpha t$ is output.

Figure 7:
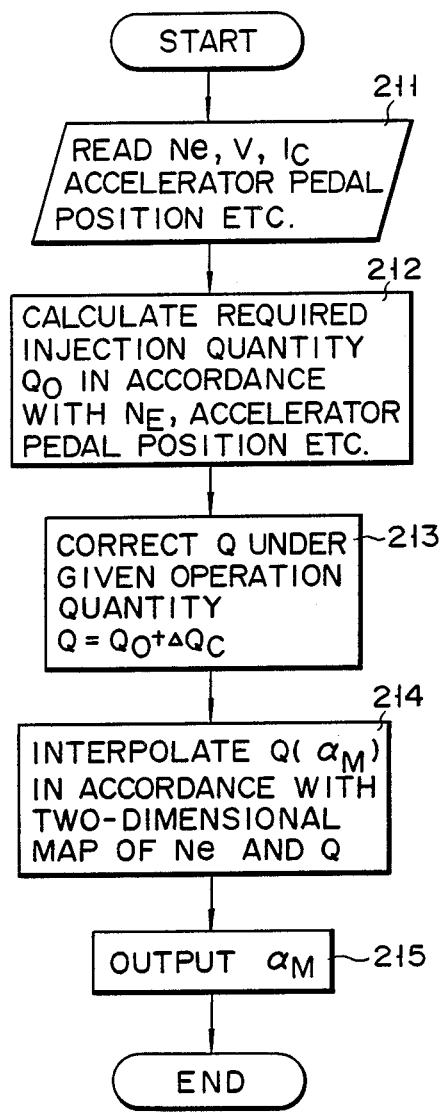

FIG. 7 is a flow chart for executing quantity control in valve 37. In step 211, engine conditions and driving conditions (e.g., vehicle speed V) are fetched, and reduced-cylinder instruction Ic is fetched to calculate required injection quantity $Q_O$ in step 212. When cylinder-reduction running is to be performed to correspond with the driving conditions, interpolation of injection quantity ($Q = Q_0 + \Delta Qc$) is made on the basis of prestored interpolation value $\Delta Qc$ in step 213.

Valve closing timing $\alpha_M$ of control valve 55 is interpolated from the prestored two-dimensional map of Ne and Q in step 214. $\alpha_M$ is output in step 215 to operate valve 37, thus initiating the quantity control operation by valve 37.

Figure 8:
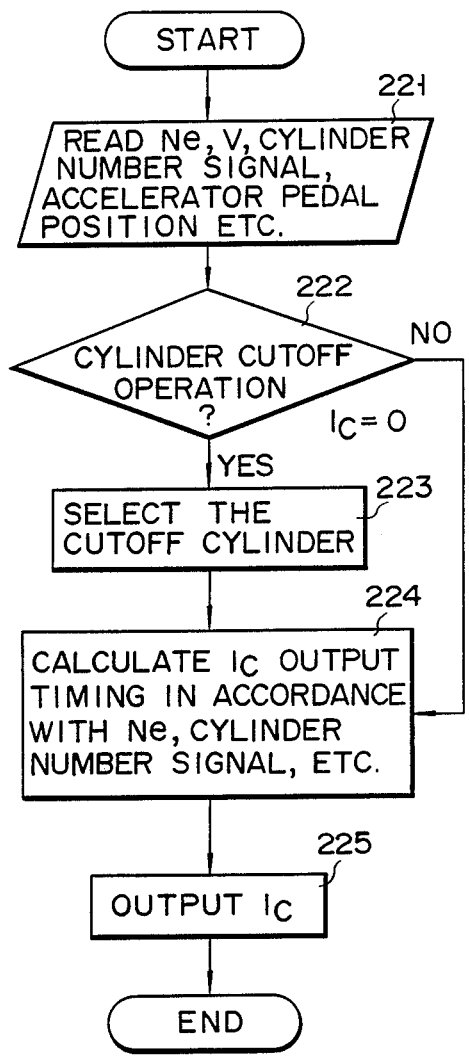

FIG. 8 is a flow chart when the cylinder-reduction running is performed. In step 221, the engine conditions, driving conditions, and a cylinder number signal are fetched to check in step 222 if the cylinder-reduction running is enabled. If YES in step 222, the flow advances to step 223, and a cylinder to be cutoff is determined based on the preset conditions.

In step 224, current Ic is supplied to solenoid 53 of valve 37 at the quantity control timing of the cylinder to be cutoff, in accordance with engine speed Ne and the cylinder number signal, to close injection quantity control valve 55, thereby interrupting the quanity control operation.

However, if NO in step 222, the flow jumps to step 224, and the quantity control operation is executed in accordance with the above operation sequence.

Figure 9:
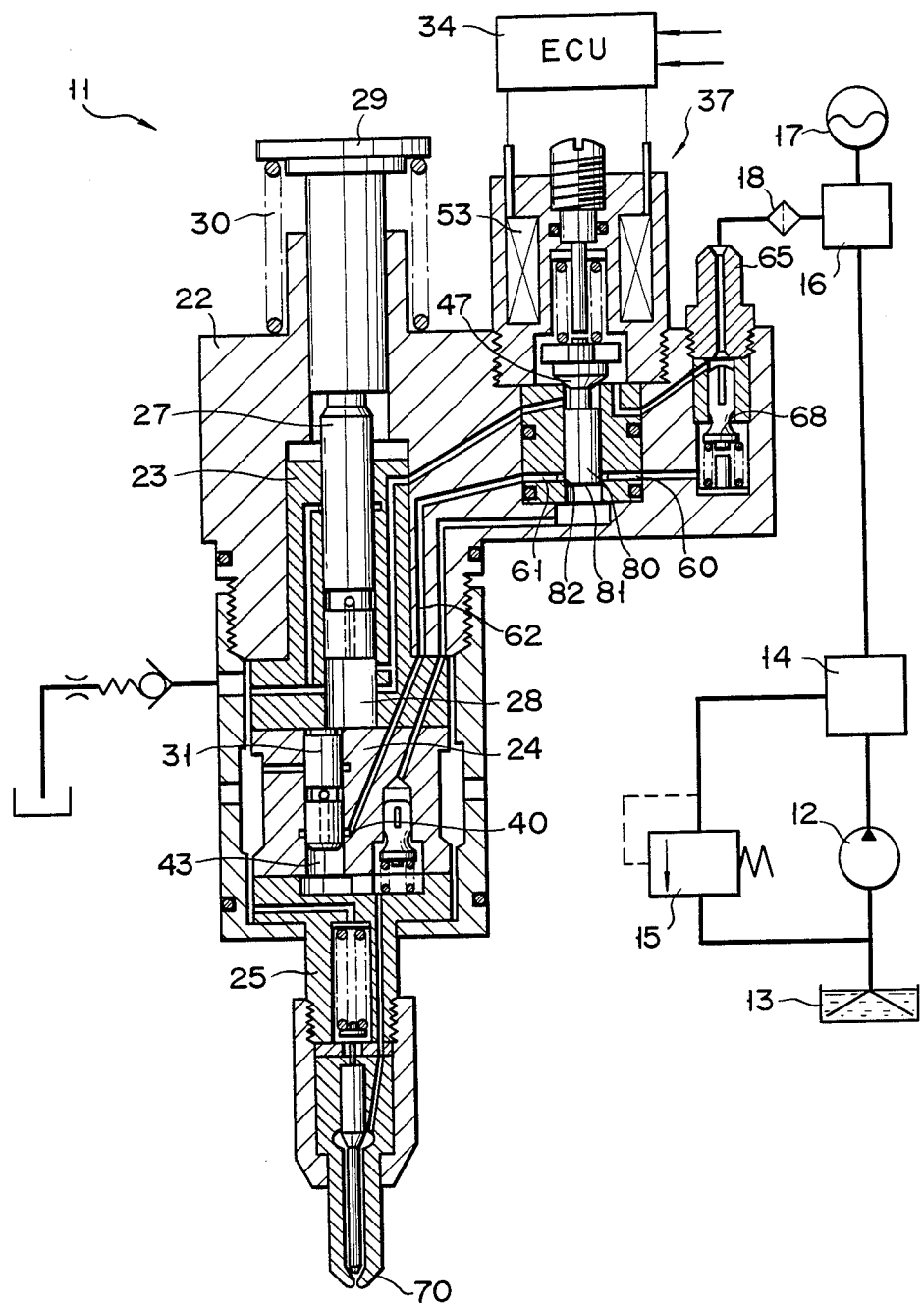
FIG. 9 is a sectional view of a fuel injection control apparatus according to a second embodiment of the present invention.

FIG. 9 shows a second embodiment of the present invention, and the same reference numerals therein denote the same parts as in FIG. 1. In this embodiment, a quantity control valve of electromagnetic valve 37 is omitted, and a passage between metering communication ports 61 and 60 is open/closed by metering reed 81 of timing valve 80, and spill passage 62 from spill port 40 communicates with port 60 through annular chamber 82 formed in the outer periphery of timing valve 80.

With this arrangement, injection timing control can be performed in the same manner as in the above embodiment. However, quantity control is initiated from when timing valve 80 is opened again.

Figure 10:
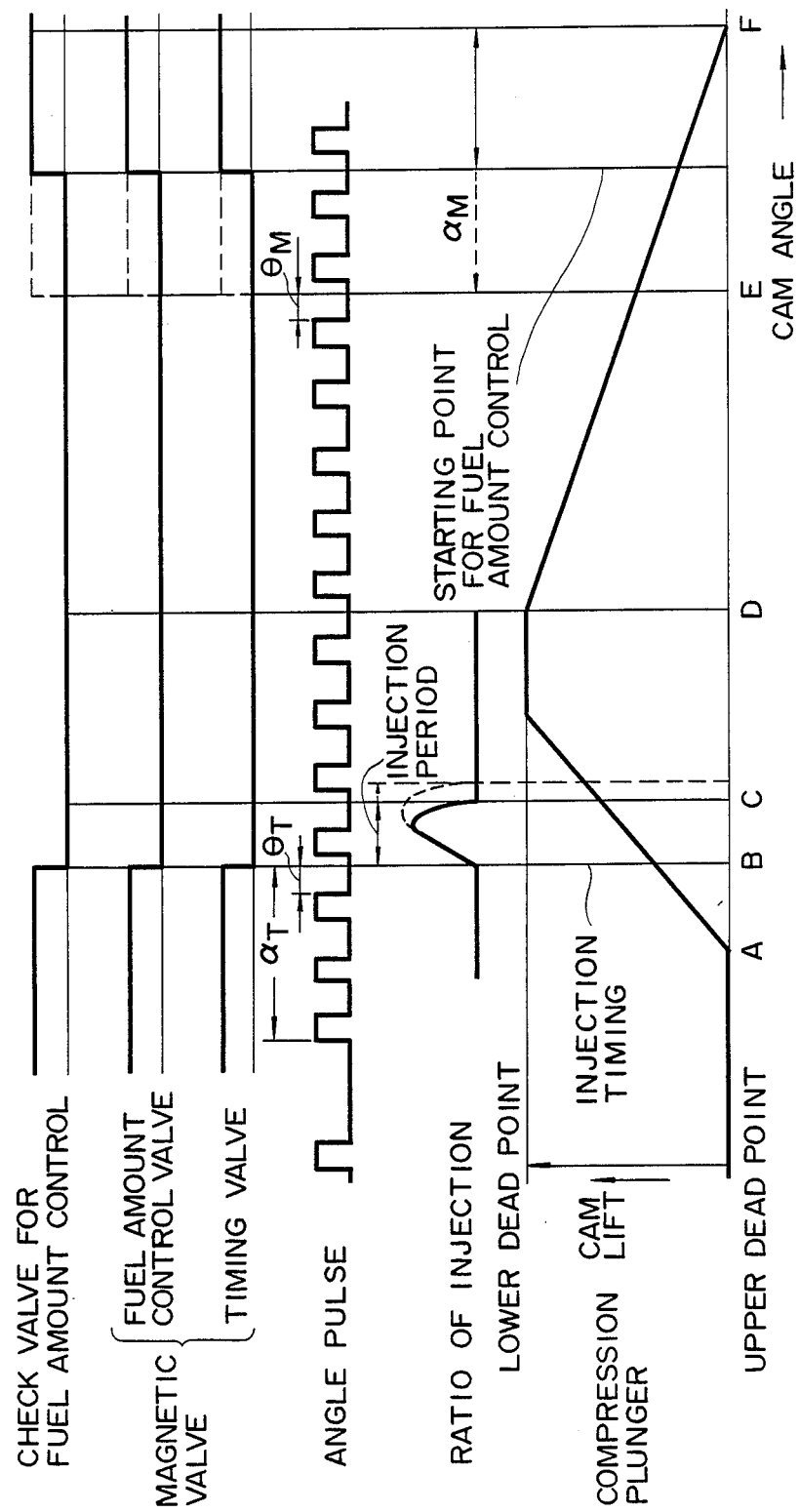
FIG. 10 is a timing chart for explaining an operation state of the apparatus shown in FIG. 9.

FIG. 10 shows an operation state of this injector. An energization current is supplied from control unit 54 to solenoid 53 of electromagnetic valve 37 when a quantity control start time is $\alpha_M$, so as to open timing valve 80. Thus, quantity-controlled fuel is then fed to injection pump chamber 43. When compression plunger 27 reaches its upper dead point (point F in FIG. 10), the quantity control operation is completed. In this case, a fuel injection quantity can be varied by varying quantity control start timing $\alpha_M$.

After the injection operation is completed, spilled fuel is fed from spill port 40 to quantity control check valve 68 through metering passage 62, and is held therein for the next quantity control operation.

With this arrangement, the structure of valve 37 for controlling an injection timing and fuel quantity can be simplified, and irregular injection caused by spilled fuel can be effectively prevented.

FIG. 11 shows another electromagnetic valve 37. Valve 37 in FIG. 11 has basically the same structure as that shown in FIG. 2. However, spring 571 has a stronger biasing force than that of spring 51, so that timing valve 47 is open and quantity control valve 55 is closed in a normal state. When an energization current is supplied to electromagnetic solenoid 531, core 52 is drawn by suction against the biasing force of spring 571, so that timing valve 47 is closed and injection quantity control valve 55 is open.

Open/close control of valves 47 and 55 can be performed in the same manner as in the first embodiment. In electromagnetic valve 37 of this embodiment, however, if the energization current cannot be supplied to solenoid 531 due to failure, control valve 55 is kept closed, the fuel quantity control operation is stopped so as not to supply injection fuel, and the engine is disabled, thus achieving a fail-safe mechanism.

In another embodiment shown in FIG. 12, the basic structure of the electromagnetic valve in FIG. 11 is left unchanged, but positions of timing valve 47 and quantity control valve 55 are reversed. More specifically, quantity control valve 55 is arranged as a normally-open valve, and quantity-controlled fuel is introduced through metering communication port 61. Valve 47 acts as a normally-closed valve, and is opened only when an energization current is supplied.

In this electromagnetic valve, when the energization current is cut off, quantity control valve 55 is closed and timing valve 47 is opened. Therefore, quantity-controlled fuel is supplied to injection pump chamber 43 without being restricted. However, since timing valve 47 is closed, timing port 32 is also closed. In this way, the fuel can no longer be supplied from port 32 to compression pump chamber 28. Pump chamber 28 receives quantity-controlled fuel only from delta port 34.

Since the quantity of fuel filled in compression pump chamber 28 is restricted, injection plunger 31 is driven to correspond with the filled quantity of fuel, and fuel injection necessary for maintaining rotation of the engine is executed.

What is claimed is:

1. A fuel injection control apparatus for use in an engine, comprising:
    a compression plunger, defining a compression pump chamber and driven in accordance with the rotation of said engine, for expelling fuel filled in said compression pump chamber;
    an injection plunger, which defines an injection pump chamber and is driven by the pressure of the fuel expelled from said compression pump chamber, a quantity of fuel determined to correspond with engine conditions being filled in said injection pump chamber;
    a fuel injector to which the fuel filled in said injection pump chamber is supplied in accordance with an operation of said injection plunger, and which is opened by the pressure of the fuel to inject the quantity-controlled fuel;
    a timing passage which communicates with said compression pump chamber and is closed when said compression plunger is driven;
    a delta port which communicates with said compression pump chamber, said delta port being closed by said compression plunger after said timing passage is closed, when said compression plunger is driven, so that an increase of fuel pressure in said compression pump chamber is delayed until after fuel is discharged from the compression pump chamber and the timing passage is closed;
    a metering fuel passage which communicates with said injection pump chamber;
    an electromagnetic valve consisting of a timing valve and a quantity control valve which are alternately turned on and off by an energization current, said timing valve communicating with said timing passage to control a passage for the fuel expelled from said compression pump chamber, and said quantity control valve communicating with said metering passage;
    fuel supply means for supplying the fuel at a given pressure to said quantity control valve of said electromagnetic valve, the fuel at the given pressure being supplied to said injection pump chamber when the pressure in said injection pump chamber is decreased to open said quantity control valve; and
    a check valve, which is closed when the fuel pressure in said injection pump chamber is lower than that supplied by said fuel supply means, for inhibiting fuel from being discharged from said injection pump chamber;
    control means which closes said timing valve of said electromagnetic valve during movement of said compression plunger so as to set a pressure increase start timing of said compresssion pump chamber, and controls valve-open time interval of said quantity control valve of said electromagnetic valve when the pressure in said injection pump chamber is decreased during a return movement of said compression plunger, thereby controlling the quantity of fuel filled in said injection pump chamber.

2. An apparatus according to claim 1, wherein said timing valve and said quantity control valve constituting said electromagnetic valve are open and closed at opposite times.

3. An apparatus according to claim 1, wherein said timing valve and said quantity control valve constituting said electromagnetic valve are coupled to each other so as to move coaxially, and each of said timing valve and said quantity control valve comprises a valve disk having a tapered surface whose diameter increases outward, so that said valve disk of one of said timing valve and said quantity control valve is in contact with a valve seat due to integrated linear motion of said timing valve and said quantity control valve, thereby closing one of said timing passage and said metering passage.

4. An apparatus according to claim 3, wherein said timing valve and said quantity control valve are supported by a first spring having a biasing force for closing said timing valve and opening said quantity control valve, and a second spring having a biasing force for opening said timing valve and closing and quantity control valve, the biasing force of said first spring is set to be larger than that of said second spring, and said timing valve and said quantity control valve are moved against the biasing force of said first spring by an electromagnetic solenoid for generating an attraction force by the energization current.

5. An apparatus according to claim 3, wherein said timing valve and said quantity control valve are supported by a first spring having a biasing force for opening said timing valve and closing said quantity control valve, and a second spring having a biasing force for closing said timing valve and opening said quantity control valve, the biasing force of said second spring is set to be larger than that of said first spring, and said timing valve and said quantity control valve are moved against the biasing force of said second spring by an electromagnetic solenoid for generating an attraction force with the energization current.

6. An apparatus according to claim 3, wherein each of said valve bodies constituting said timing valve and said quantity control valve comprises a piston portion extending from a small-diameter portion of said valve disk, and said piston portions are in contact with each other and can be disengaged from each other, thus making said timing valve and said quantity control valve independent.

7. An apparatus according to claim 1, wherein said timing valve and said quantity control valve constituting said electromagnetic valve are coupled to each other so as to move coaxially, and when said timing valve opens said timing passage, said quantity control valve also opens said metering passage.

8. An apparatus according to claim 1, wherein said timing valve constituting said electromagnetic valve comprises a piston portion movable in a cylindrical guide portion, an introduction chamber formed by notching an outer peripheral portion of said piston portion into a groove shape, and a valve disk having a tapered surface from said introduction chamber, so that the tapered surface of said valve disk is in contact with a valve seat formed on an edge portion of said guide portion and having the same diameter, and that when said tapered surface is in contact with said valve seat, fuel from said timing valve is fed to said introduction chamber so as not to apply a fuel pressure to said timing valve as a moving force thereof.

9. An apparatus according to claim 1, wherein said delta port communicates with said timing passage.

10. An apparatus according to claim 1, wherein said timing passage is closed by a timing reed arranged in said compression plunger when said compression plunger is driven, and is open to a position corresponding to a most delayed closing timing of said timing passage.

11. An apparatus according to claim 1, wherein said control means controls said electromagnetic valve in accordance with the fuel injection timing, so that said quantity control valve of said electromagnetic valve is opened for a time interval corresponding to the fuel injection quantity during the return movement of said compression plunger.

12. An apparatus according to claim 1, wherein said quantity control valve constituting said electromagnetic valve is closed when said compression plunger starts the return movement, and is opened before a time interval from completion of the return movement passes, the time interval corresponding with a controlled fuel quantity.

13. An apparatus according to claim 1, wherein said electromagnetic valve is arranged such that said timing valve is closed and said quantity control valve is opened when no energization current is supplied, and said delta port is formed in said compression pump chamber to be adjacent to said timing passage so that fuel is fed to said compression pump chamber through said delta port when no energization current is supplied to said electromagnetic valve.

* * * * *